Inventor
Peter Engholm
By his Attorneys
Williamson & Merchant

Patented Oct. 10, 1922.

1,431,384

UNITED STATES PATENT OFFICE.

PETER ENGHOLM, OF MINNEAPOLIS, MINNESOTA, ASSIGNOR TO CLOVER LEAF CREAMERY COMPANY, OF MINNEAPOLIS, MINNESOTA, A CORPORATION OF MINNESOTA.

OPERATING MECHANISM FOR DISTRIBUTING VALVES IN PASTEURIZING APPARATUS.

Application filed June 23, 1919. Serial No. 306,035.

*To all whom it may concern:*

Be it known that I, PETER ENGHOLM, a citizen of the United States, residing at Minneapolis, in the county of Hennepin and State of Minnesota, have invented certain new and useful Improvements in Operating Mechanism for Distributing Valves in Pasteurizing Apparatus; and I do hereby declare the following to be a full, clear, and exact description of the invention, such as will enable others skilled in the art to which it appertains to make and use the same.

My invention relates to improvements in pasteurizing apparatus, and more specifically to the timed driving connections for operating the distributing valve of the holder.

To the above end, generally stated, the invention consists of the novel devices and combinations of devices hereinafter described and defined in the claims.

In commercial forms of pasteurizing apparatuses, the milk is conveyed from a heater to a multiple compartment holder, where the milk in a given compartment is held a predetermined period of time and then released and conveyed to a cooler. The movement of the milk from the heater to the holder and from the holder to the cooler and the length of time it is held in the respective compartments of the holder is automatically controlled by a timed distributing valve. This distributing valve causes a great deal of trouble by getting out of its proper relation to the ports in the valve casing, due principally to loose joints and wear between the different parts of the timed operating connections therefor, thus rendering uncertain the filling and emptying of the holder and the length of time the milk is held therein. To overcome this difficulty with such distributing valves, I provide highly efficient timed operating connections therefor, and which connections are not liable to get out of order, are not subject to much wear, and may be easily adjusted to compensate for wear.

In the accompanying drawings, which illustrate the invention, like characters indicate like parts throughout the several views.

Referring to the drawings:—

Figure 1:
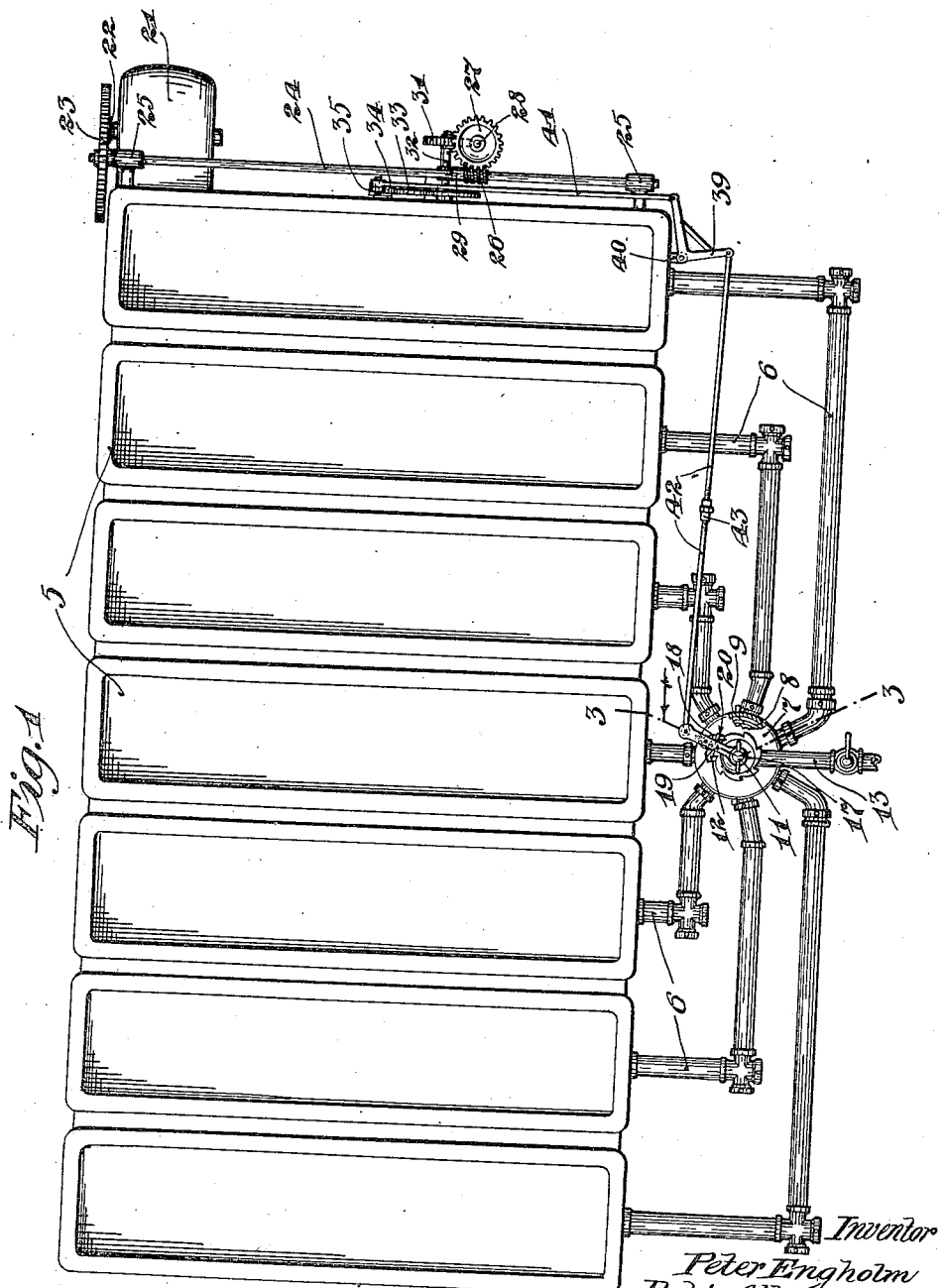
Fig. 1 is a plan view of the holder of a pasteurizing apparatus.
Figure 2:
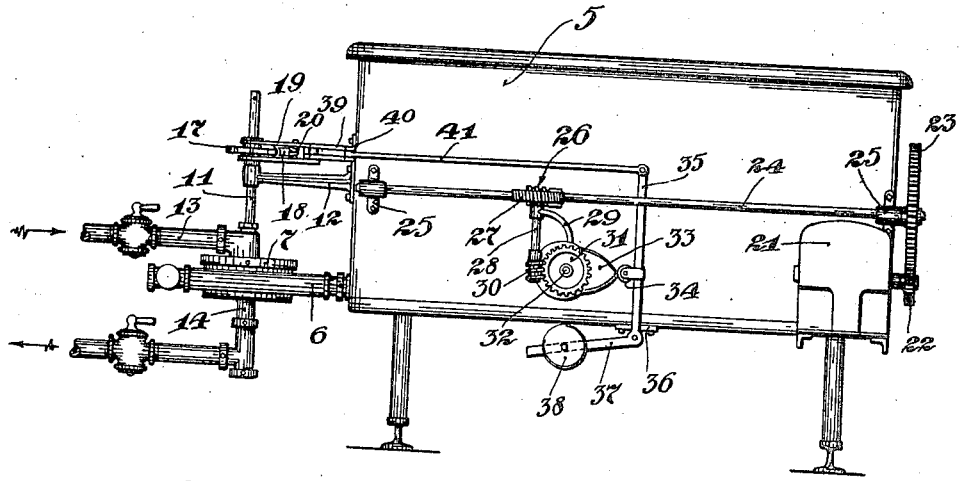
Fig. 2 is a right-hand end elevation of the same.

The numeral 5 indicates a multiple compartment holder, each compartment of which is connected by a pipe 6 to a horizontally disposed annular valve casing 7. These pipes 6 are attached to radially extended ports 7' formed in the valve casing 7 and circumferentially spaced equal distances apart. A rotary distributing valve 8 is mounted in the valve casing 7 and horizontally separates said casing into an upper or receiving chamber 9 and a lower or discharge chamber 10. The valve 8 is provided with a stem 11 which projects through the top of the valve casing 7 and is journaled in a bearing bracket 12 secured to the holder 5.

Figure 3:
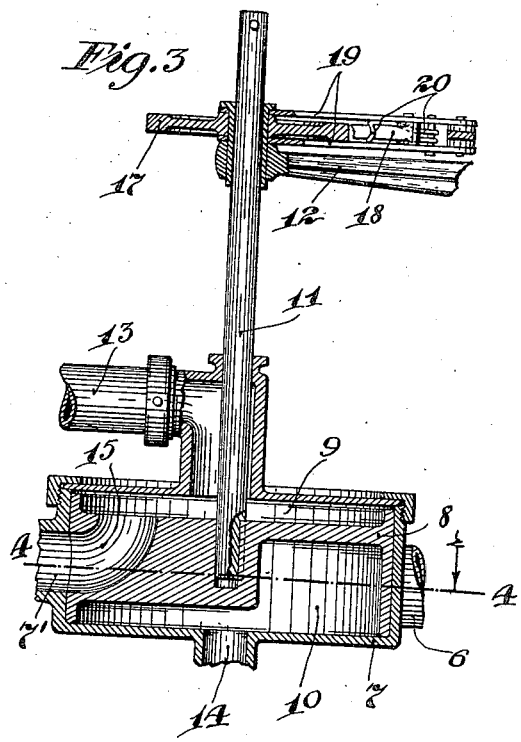
Fig. 3 is a detail view, principally in vertical section, taken on the line 3—3 of Fig. 1, on an enlarged scale.
Figure 4:
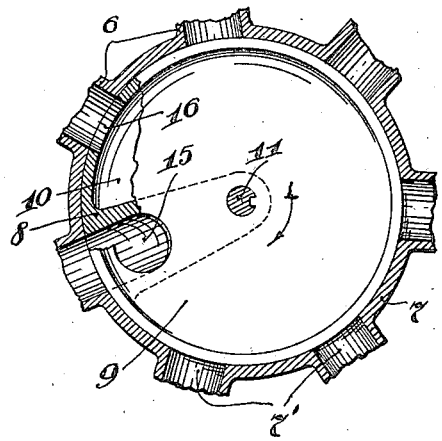
Fig. 4 is a detail view in horizontal section taken substantially on the line 4—4 of Fig. 3.

Leading from the heater, not shown, is a pipe 13, attached to the top of the valve casing 7 and opens into the receiving chamber thereof, and a pipe 14, attached to the bottom of said casing, leads to a cooler, not shown. Two ports 15 and 16 are formed in the distributing valve 8, the former of which is arranged to successively connect the pipes 6 to the receiving chamber 9 of the valve casing 7, as best shown in Fig. 3, and the latter of which is arranged to successively connect said pipes to the discharge chamber 10 of said valve casing, as best shown in Fig. 4.

A ratchet wheel 17 is secured to the valve stem 11, just above the bearing bracket 12 for rotation therewith and the number of teeth thereof correspond to the number of ports 7' which, in turn, correspond with the number of compartments in the holder 5. Co-operating with the ratchet wheel 17, is a one-way pawl 18 intermediately pivoted to and between a pair of arms 19, which, in turn, are pivoted at their inner ends around the valve stem 11 and located on opposite sides of said ratchet wheel. A spring 20 anchored to the arms 19 yieldingly holds said pawl 18 in engagement with the ratchet wheel 17.

To impart a step by step movement to the valve 8 to bring its ports 15 and 16 into registration with the ports 7', there is mounted on the right-hand end of the holder 5 an electric motor 21 having on its shaft a pinion 22, which meshes with a gear wheel 23 secured to the rear end of a horizontal shaft 24 journaled in bearings 25 on the respective end of said holder. Keyed to the intermediate portion of the shaft 24, is a worm 26 which meshes with a worm wheel 27 keyed to the upper end of a short vertical shaft 28 journaled in a bearing bracket 29 secured to the holder 5 and having on its lower end a worm 30, which meshes with a worm wheel 31 journaled in a stub 32 secured to said holder.

Secured to the worm wheel 31 for rotation therewith, is a cam 33 which engages a roller 34 intermediately journaled on a vertically disposed lever 35 fulcrumed at its lower end to a bracket 36 secured to the holder 5. On the lower end of the lever 35, is a horizontally disposed arm 37 having mounted thereon a slidably adjustable weight 38 arranged to hold the roller 34 onto the periphery of the cam 33, for imparting an oscillatory movement to the lever 35. A horizontally disposed bell crank 39 is mounted on a bracket 40 secured to the front of the holder 5, close to the right-hand end thereof, and one of its arms is connected by a link 41 to the upper end of the lever 35 and its other arm is connected by a link 42 to the outer ends of the arms 19. The link 42 is made in two sections and which sections are connected by a turnbuckle 43, by means of which the operative length of said link may be varied, at will. Obviously, by adjusting the turnbuckle 43, the arms 19 may be set so that the pawl 18, acting through the ratchet wheel 17, will always stop the valve 8 with its ports 15 and 16 in registration with the respective ports 7'.

What I claim is:—

1. In a pasteurizing apparatus, the combination with a multiple holder comprising a series of alined compartments and a timed intermittently operated distributing valve for controlling the filling and the emptying of the compartments in said holder, of a ratchet wheel on the stem of said valve, an arm pivoted to the valve stem, a pawl carried by the arm for co-operation with the ratchet wheel to impart a step by step movement to the valve, a cam-controlled oscillating lever, a bell crank, and two links connecting one arm of the bell crank to said arm and the other arm of said bell crank to said lever.

2. In a pasteurizing apparatus, the combination with a multiple holder comprising a series of alined compartments and a timed intermittently operated distributing valve for controlling the filling and the emptying of the compartments in said holder, of a ratchet wheel on the stem of said valve, an arm pivoted to the valve stem, a pawl carried by the arm for co-operation with the ratchet wheel to impart a step by step movement to the valve, a cam-controlled oscillating lever, a bell crank, two links connecting one arm of the bell crank to said arm and the other arm of said bell crank to said lever, and means for varying the operating length of one of said links.

3. In a pasteurizing apparatus having a multiple holder comprising a series of alined compartments and conduits leading from said compartments, a distributing device comprising a timed distributing valve having receiving and discharging chambers, each having ports adapted to be connected successively with the conduits from said compartments, and means for intermittently moving said valve to bring the said ports into such successive connection.

4. A pasteurizing apparatus having in combination, a series of liquid holding compartments, conduits leading therefrom and connected in circumferentially spaced relation to the cylindrical casing of a common distributing valve, a supply conduit connected to the center of said casing, a valve having an upper cylindrical chamber rotatable in said casing, said chamber having communication with said supply conduit and having a port adapted to register with any one of said circumferentially arranged conduits, said casing also having a central discharge outlet, and said valve also having a lower cylindrical chamber communicating with said central discharge outlet and having a port adapted to communicate with any one of said circumferentially arranged conduits.

In testimony whereof I affix my signature in presence of two witnesses.

PETER ENGHOLM.

Witnesses:
CLARA DEMAREST,
HARRY D. KILGORE.